(No Model.)
J. W. HURST.
CAR BRAKE.
No. 409,683. Patented Aug. 27, 1889.
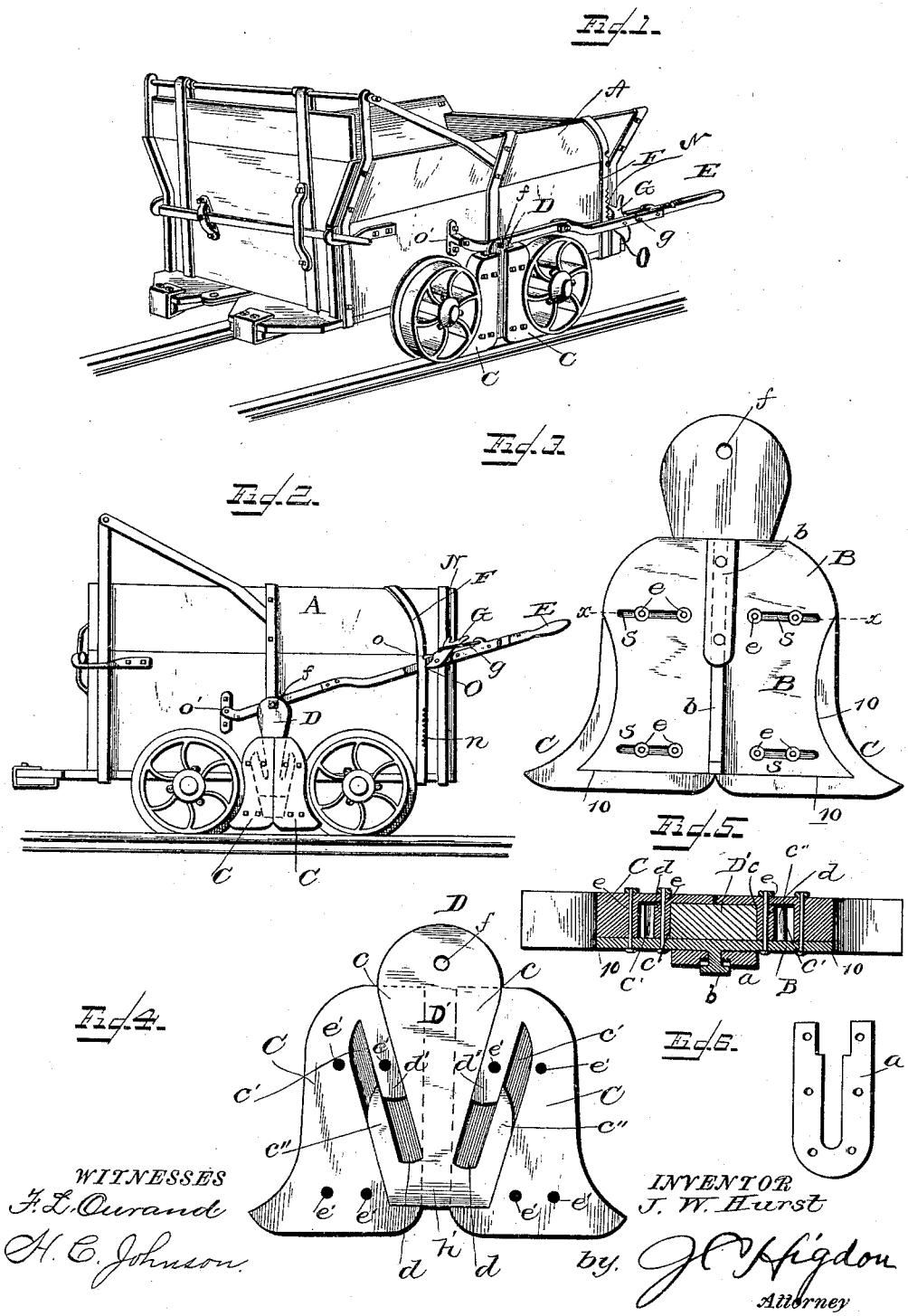
WITNESSES
F. L. Ourand
H. C. Johnson
INVENTOR
J. W. Hurst
by J. C. Higdon
Attorney

UNITED STATES PATENT OFFICE.

JAMES W. HURST, OF HOTCHKISS, COLORADO.

CAR-BRAKE.

SPECIFICATION forming part of Letters Patent No. 409,683, dated August 27, 1889.

Application filed February 19, 1889. Serial No. 300,474. (No model.)

*To all whom it may concern:*

Be it known that I, JAMES W. HURST, of Hotchkiss, Delta county, Colorado, have invented certain new and useful Improvements in Car-Brakes, of which the following is a full, clear, and exact description, reference being had to the accompanying drawings, forming a part hereof.

My invention relates to a combined wheel and rail-brake, and is particularly adapted for mining cars, though it can be used upon cars of all descriptions.

The ordinary method of braking cars is to apply the brake-shoes directly to the treads of the wheels; but this plan is objectionable for the reason that the axle is subjected to a severe torsional strain and the wheels are slid along on the rails, which tends to flatten the surface of the same and render traveling very annoying and dangerous.

The object of my invention is to provide a simple and durable device that will remedy these evils, and one that will check the motion of the car in much less time than those formerly used; and with these objects in view it consists in the novel construction and combination of the various parts, as will be more fully hereinafter described and claimed.

In the drawings forming a part of this specification, Figure 1 is a perspective view of a car with my improved brake as applied. Fig. 2 is a side view of a car with my brake as released. Fig. 3 is a rear view of the brake-blocks with wedge raised. Fig. 4 shows the interior of the brake mechanism, the rear plate being removed and the wedge shoved down. Fig. 5 is a longitudinal section taken on the line $x\ x$ of Fig. 3; and Fig. 6 is a detail view of a slotted frame made use of in carrying out the invention.

I will first describe the construction of my improved brake and then the manner in which it is attached to the car and operated.

In constructing my device I employ a rear plate B, approximately shield-shaped and having the vertical T-shaped tongue or tenon $b$ cast integral therewith, and it is provided with slots $s\ s$, the purpose of which will appear farther on. The front part C, which forms the brake-blocks and shoes, is cast in two pieces. The two pieces are cast of a width corresponding to the tread of the wheels and rails, and are formed with the inclined recesses or slots $c'\ c'$, as best shown in Fig. 4, said slots or recesses being so arranged as to leave partitions or flanges $d'\ d'$. The wedge D, which works in and operates the brake-blocks C, is cast with a head D', said head consisting of the bottom part $h'$ and the oblique arms $c''\ c''$, said arms being cast to fit loosely in the slots or recesses $c'\ c'$ and form the slots $d\ d$, in which work the partitions or flanges $d'\ d'$. When the wedge D is in position in the brake-blocks C, as shown in Fig. 4, the main body portion of the wedge will occupy the recesses $c\ c$, and the head and oblique arms will occupy the recesses $c'\ c'$, and is intended to slide freely within the same. When the wedge D has been placed in position in the brake-blocks C C, the rear plate B is placed upon the rear sides of the same and securely bolted by means of the bolts $e\ e$, passing through the slots $s\ s$ in the rear plate and holes $e'\ e'$ in the brake-block C. The brake-blocks C C are cast larger than the rear plate and are provided with flanges 10, which extend around and beneath the sides of the said rear plate, as clearly shown in Figs. 3 and 5.

As shown in the drawings, the brake-blocks C serve also as shoes; but it is preferred to have the side and bottom parts mortised or recessed to receive a brake-shoes of any desired plan and material, as in this way the durability of the device is much increased, as the shoes when worn can be removed and replaced. The sides of the brake-blocks are curved to conform to the contour of the wheel, and the bottom part is made flat and adapted to bear upon the tread of the rail. When the wedge is shoved down, the blocks will be lowered and spread, the rear plate being slotted, as shown, to permit a sufficient lateral movement.

The brake, constructed as described, is attached to the side of the car, between the wheels, by placing the vertical T-shaped tongue in the slotted frame $a$, secured to the side of the car, said slot being closed at its bottom to prevent the brake-blocks falling too low when the car is off the track. The lever E, which is fulcrumed at O', is attached to the wedge D at $f$ and at a short distance beyond this point is bent outward in order to avoid the flaring top of the car. The lever E is slotted, as shown, and works upon the ratchet-bar F, securely attached to the side of the car, and within said slotted portion of the lever is carried the pawl G, said pawl having the dogs N and O arranged at opposite ends and adapted to engage the ratchet-teeth $n$ $o$ respectively. When it is desired to hold the pawl in engagement with the ratchet-bar, I employ the loop-ring $g$, which presses against or passes over the pawl G and holds it in the desired position, as clearly shown in Figs. 1 and 2. The brake as released is shown in Fig. 2, and when it is desired to apply the same the loop-ring $g$ is thrown back, pawl G released, and the lever E thrown down. This immediately forces the wedge D down, and, carrying with it the entire brake, operating the blocks and pressing the shoes firmly against the tread of the rails and wheels. By this arrangement the friction-surface is largely increased and the car is stopped much quicker than where the brake is applied to only the wheel or the rails. If desired, brakes may be used on either side and connected by suitable means and operated simultaneously, or they may be separated and operated independently, as desired.

I am aware that it is not new to apply brake-shoes to both wheels and rails, and I therefore do not broadly claim such as my invention; but

What I claim as new, and desire to secure by Letters Patent, is—

1. In a combined wheel and rail brake, the combination of oppositely-disposed brake-blocks, which are adapted to engage both the treads of the car-wheels and the rail, and a wedge located in direct contact with said blocks and adapted to spread them by downward movement, substantially as shown and described.

2. In a combined wheel and rail brake, the combination of oppositely-located brake-blocks and a vertically-sliding wedge, which wedge is located between said blocks and adapted to both spread and depress them when said wedge is moved downward, substantially as shown and described.

3. In a combined wheel and rail brake, the combination, with a rear plate B, slotted as shown, of the brake-blocks C C, recessed at $c$ and $c'$, the wedge D, formed with the oblique arms $c''$ and slots $d$, all arranged and adapted to operate substantially as shown and described.

4. In a combined wheel and rail brake, the combination of oppositely-located brake-blocks provided with inclined recesses $c'$ $c'$, a wedge located between said blocks in direct contact therewith and provided with the oblique arms $c''$ $c''$, and means for raising and depressing said wedge, substantially as described.

5. The combination, with the brake-blocks, of a wedge sliding between the same to lower and spread them, a slotted lever fulcrumed to the side of the car and connected with the sliding wedge to operate the same, a ratchet-bar working in the slot in the lever, and the pawl G, carried within such slot and adapted to engage the teeth of the bar F, substantially as and for the purpose described.

6. In a combined wheel and rail brake, the combination, with the rear plate B, provided with the tongue $b$ and slots $s$, of the brake-blocks C C, secured to the same and recessed to receive the wedge D, said wedge being adapted to slide freely within said recesses to spread the shoes, a slotted plate $a$, secured to the side of the car to receive the tongue $b$ and hold the brake to the side of the car, a lever E, connected with the top of the wedge and fulcrumed to the side of the car at a point beyond the brake, the ratchet-bar F, pawl G, and ring-loop $g$, all arranged and adapted to operate substantially as shown and described.

In testimony whereof I affix my signature in presence of two witnesses.

JAMES W. HURST.

Witnesses:
AMOS R. HOWARD,
ALFRED R. KING.